(12) United States Patent
Qi et al.

(10) Patent No.: US 8,929,792 B2
(45) Date of Patent: Jan. 6, 2015

(54) FUSER MEMBER

(71) Applicant: Xerox Corporation, Norwalk, CT (US)

(72) Inventors: Yu Qi, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 29 days.

(21) Appl. No.: 13/722,283

(22) Filed: Dec. 20, 2012

(65) Prior Publication Data

US 2014/0178658 A1   Jun. 26, 2014

(51) Int. Cl.
*G03G 15/20* (2006.01)
*B32B 7/02* (2006.01)
*B32B 27/34* (2006.01)
*B32B 27/00* (2006.01)
*B32B 17/10* (2006.01)
*C09D 127/20* (2006.01)
*C09D 7/12* (2006.01)
*C09D 127/18* (2006.01)
*C09D 127/12* (2006.01)

(52) U.S. Cl.
CPC ............ *G03G 15/2057* (2013.01); *B32B 27/00* (2013.01); *C09D 127/20* (2013.01); *C09D 7/1291* (2013.01); *C09D 127/18* (2013.01); *C09D 127/12* (2013.01); *G03G 2215/2009* (2013.01); *G03G 2215/2032* (2013.01)
USPC ........ 399/333; 428/215; 428/395; 428/473.5; 428/435

(58) Field of Classification Search
CPC .. C09D 127/18; C09D 127/12; C09D 127/20; C09D 7/1216; C09D 7/1291
USPC ............ 399/333; 521/141, 145, 147, 50, 146, 521/149; 428/215, 395, 435, 473.5
See application file for complete search history.

(56) References Cited

U.S. PATENT DOCUMENTS

| 7,868,083 | B2 * | 1/2011 | Ristic-Lehmann et al. | .. 524/544 |
| 2008/0287561 | A1 * | 11/2008 | Menashi et al. | ............... 521/142 |
| 2009/0082479 | A1 * | 3/2009 | Cho | ............................... 521/141 |
| 2010/0226701 | A1 * | 9/2010 | Moorlag | ....................... 399/333 |

OTHER PUBLICATIONS

Meador et al., "Mechanically Strong, Flexible Polyimide Aerogels Cross-Linked with Aromatic Triamine", ACS Applied Materials and Interfaces, 2012, 4, 536-544.

\* cited by examiner

*Primary Examiner* — Prashant J Khatri
*Assistant Examiner* — Travis Figg
(74) *Attorney, Agent, or Firm* — Hoffman Warnick LLC

(57) ABSTRACT

A fuser member having a substrate and a polyimide aerogel layer disposed on the substrate is shown. The polyimide aerogel layer has a porosity of from about 50 percent to about 95 percent. A fluoropolymer surface layer is disposed on the polyimide aerogel layer.

20 Claims, 4 Drawing Sheets

FUSER MEMBER

CROSS REFERENCE TO RELATED APPLICATIONS

This application relates to commonly assigned copending application Ser. No. 13/722,273, filed simultaneously herewith and incorporated by reference herein in its entirety.

BACKGROUND

1. Field of Use

This disclosure is generally directed to intermediate layers for fuser members useful in electrophotographic imaging apparatuses, including digital, image on image, and the like.

2. Background

Typical fuser members include an intermediate layer that provides cushioning and a support for a release layer. The intermediate layer is usually some type of elastomer or rubber such as silicone. However, silicone and other elastomeric materials can degrade when subjected to elevated temperatures during manufacture. This can cause inadequate performance of the fuser member. It would be desirable to have materials that are useful as intermediate layers in fuser members that could withstand higher manufacturing temperatures.

SUMMARY

According to an embodiment, there is provided a fuser member comprising a substrate and a polyimide aerogel layer disposed on the substrate. The polyimide aerogel layer has a porosity of from about 50 percent to about 95 percent. A surface layer comprising a fluoropolymer is disposed on the polyimide aerogel layer.

According to another embodiment, there is provided a fuser member having a substrate, a polyimide aerogel layer disposed on the substrate and a surface layer comprising a fluoropolymer disposed on the heat resistant layer. The polyimide aerogel layer comprises a porosity of from about 50 percent to about 95 percent and a pore size of from about 2 nm to about 200 nm.

According to another embodiment, there is described a fuser member having a substrate, a polyimide aerogel layer disposed on the substrate and a surface layer disposed on the polyimide aerogel layer. The polyimide aerogel layer has a porosity of from about 50 percent to about 95 percent and a pore size of from about 2 nm to about 200 nm. The polyimide aerogel layer has a thickness of from about 0.5 mm to about 10 mm. The release layer is a fluorolastic selected from the group consisting of polytetrafluoroethylene and perfluoroalkoxy polymer resin.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
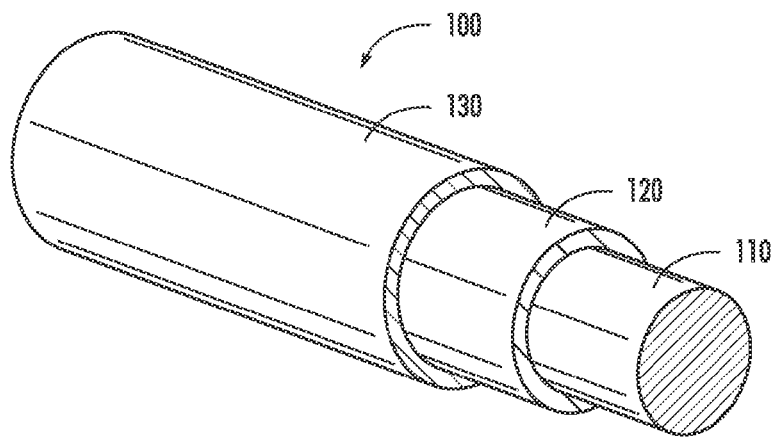
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 2:
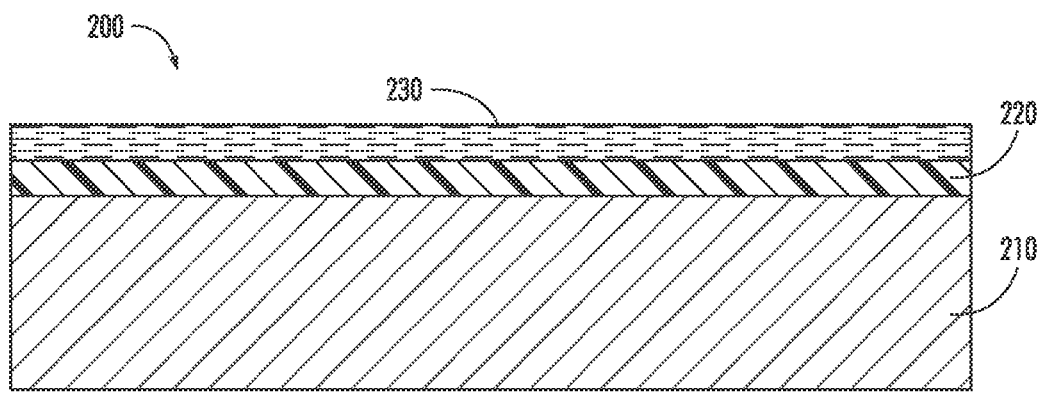
FIG. 2 depicts an exemplary fusing member having a belt substrate in accordance with the present teachings.

Specifically, FIG. 1 depicts an exemplary fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1, the exemplary fixing member 100 can be a fuser roller having a cylindrical substrate 110 with one or more functional layers 120 (also referred to as intermediate layers) and an outer layer 130 formed thereon. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon.

Substrate Layer

The belt substrate 210 (FIG. 2) and the cylindrical substrate 110 (FIG. 1) can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes) and metal materials (e.g., aluminum, nickel or stainless steel) to maintain rigidity and structural integrity as known to one of ordinary skill in the art.

Intermediate Layer

Disclosed herein is a polyimide aerogel that is suitable as an intermediate layer 120 (FIG. 1) 220 (FIG. 2) in a fuser member. The polyimide aerogel provides cushioning for the release layer and provides a supporting substrate for the release layer. The polyimide aerogel is mechanically strong, flexible and heat resistant. The polyimide aerogel has a porosity of from about 50 percent to about 95 percent. The polyimide aerogel has excellent flexibility, high tensile strengths (i.e. 4-9 MPa), and high onset decomposition temperature. A fuser belt can be made by coating the high-temperature polyimide gel layer on top of the substrate layer, followed by coating a surface release layer. Optionally, a heat resistant reinforcement layer is coated between the foam and the surface release layer.

For a roller configuration, the thickness of the intermediate or functional layer can be from about 0.010 mm to about 10 mm, or from about 1 mm to about 8 mm, or from about 2 mm to about 7 mm. For a belt configuration, the functional layer can be from about 10 microns up to about 2 mm, or from 25 microns to about 1.5 mm, or from 50 microns to about 1 mm.

Release Layer

An exemplary embodiment of a release layer 130 (FIG. 1), 230 (FIG. 2) includes a fluoropolymer. Fluoropolymers suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP) and a cure site monomer, and mixtures thereof. The fluoropolymer particles provide chemical and thermal stability and have a low surface energy. The fluoropolymer particles have a melting or curing temperature of from about 255° C. to about 360° C. or from about 280° C. to about 330° C. These particles are melted or cured to form the release layer.

For the fuser member 100 (FIG. 1), 200 (FIG. 2), the surface layer or release layer 130 (FIG. 1), 230 (FIG. 2) can be from about 10 microns to about 100 microns, or from about 20 microns to about 80 microns, or from about 40 microns to about 60 microns.

Additives and additional conductive or non-conductive fillers may be present in the substrate layers 110 (FIG. 1) and 210 (FIG. 2), the intermediate layers 120 (FIG. 1) and 220 (FIG. 2) and the release layers 130 (FIG. 1) and 230 (FIG. 2). In various embodiments, other filler materials or additives including, for example, inorganic particles, can be used for the coating composition and the subsequently formed surface layer. Conductive fillers used herein may include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

The release layer is coated on the polyimide aerogel layer in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like. The fluoropolymer is then cured or melted to form a release layer.

Adhesive Layer

Optionally, any known and available suitable adhesive layer may be positioned between the release layer 130 (FIG. 1), 230 (FIG. 2), the intermediate layer 120 (FIG. 1), 220 (FIG. 2) and the substrate. 110 (FIG. 1), 210 (FIG. 2). Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Additives and additional conductive or non-conductive fillers may be present in the substrate layers 110 (FIG. 1) and 210 (FIG. 2), and 230 (FIG. 2) and the release layers 130 (FIG. 1) and 230 (FIG. 2). In various embodiments, other filler materials or additives including, for example, inorganic particles, can be used for the coating composition and the subsequently formed surface layer. Conductive fillers used herein may include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

Figure 3A:
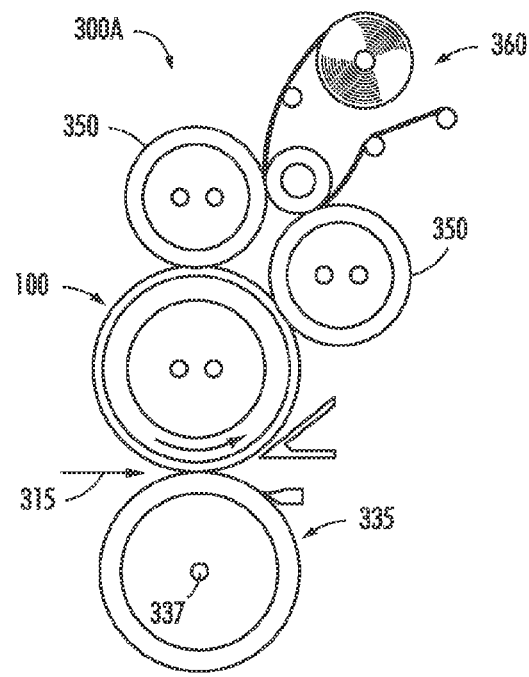
FIGS. 3A-3B depict exemplary fusing configuration using the fuser rollers shown in FIG. 1 in accordance with the present teachings.
Figure 3B:
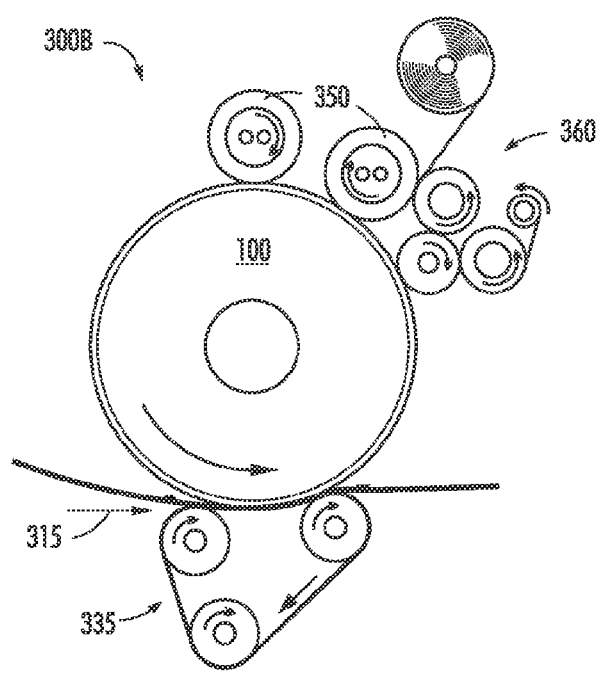
Figure 4A:
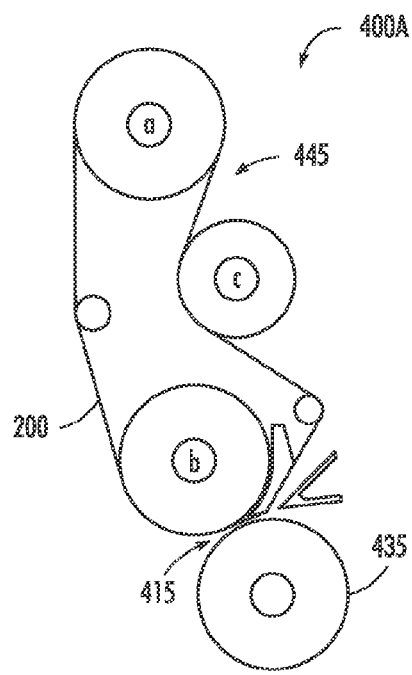
FIGS. 4A-4B depict another exemplary fusing configuration using the fuser belt shown in FIG. 2 in accordance with the present teachings.
Figure 4B:
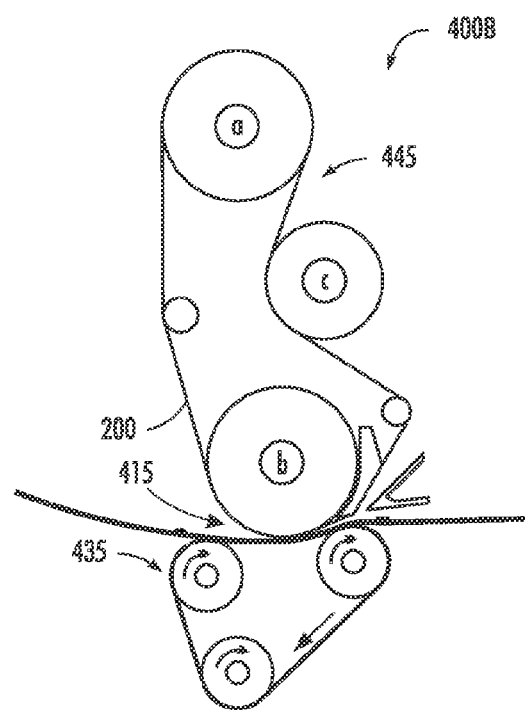

FIGS. 3A-3B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rollers 445a-c, which can also be used as heat rollers when needed.

Figure 5:
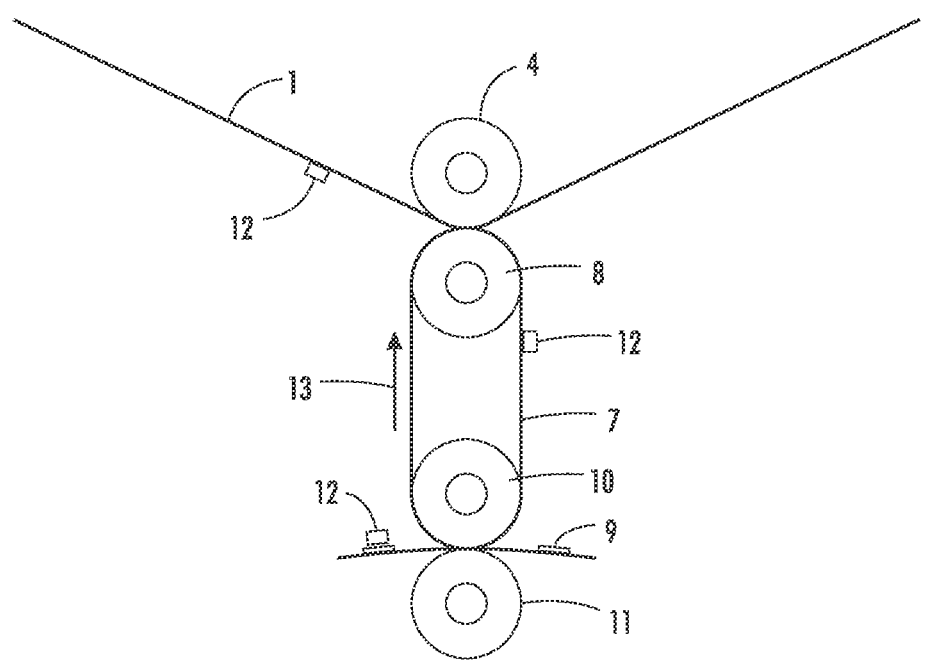
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

An intermediate layer of a polyimide aerogel (also referred to as polyimide foam) is disclosed for use as an intermediate layer in a fuser member. The polyimide aerogel layer is between the substrate and surface release layer 130 (FIG. 1), 230 (FIG. 2), although other optional intermediate layers can be included in the fuser member. The polyimide aerogel layer provides improved performance in impact absorption, conformability, flexibility and energy management. As a result, fuser members having a polyimide aerogel layer minimize paper damage, provide improved fusing efficiency, provide a wide media latitude, improve image quality, and enhance energy efficiency.

Described herein is a polyimide aerogel or polyimide foam for use as an intermediate layer in a fuser member that provides heat-resistance and insulation. The polyimide aerogel has a density of from about 0.1 gm/cm$^3$ to about 0.5 gm/cm$^3$, or from about 0.15 gm/cm$^3$ to about 0.45 gm/cm$^3$, or from about 0.2 gm/cm$^3$ to about 0.4 gm/cm$^3$. The polyimide aerogel has a surface area of from about 100 m$^2$/g to about 550 m$^2$/g, or from about 150 m$^2$/g to about 450 m$^2$/g or from about 200 m$^2$/g to about 400 m$^2$/g. The polyimide aerogel has a pore diameter of from about 2 nm to about 200 nm, or from 5 nm to about 180 nm or 10 nm to about 150 nm.

The polyimide aerogel layer is prepared by coating a composition that forms a gel. The solvent is extracted from the polyimide gel. After extraction of the solvent, a polyimide aerogel layer remains which is suitable as an intermediate layer in a fuser member. A fluoropolymer release layer is then coated on the polyimide aerogel layer and cured to from a fuser member.

Polyimide gels are made by coating a composition of one or more anhydride capped polyamic acid oligomers and one or more multi-amines (diamines or triamines) in a solvent to form a gel. The multi-amines crosslink the polyamic acid oligomers through an imidization reaction to form a polyimide gel layer. After the imidization reaction is completed, the solvent is removed through solvent extraction providing a polyimide aerogel layer. Solvent extraction can be accomplished through supercritical $CO_2$. The cast polyimide aerogel films have excellent flexibility, high tensile strengths (i.e. 4-9 MPa), and high onset decomposition temperatures (i.e., 460° C.-610° C.).

The disclosed anhydride capped polyamic acid oligomers include one of a polyamic acid of pyromellitic dianhydride, a polyamic acid of pyromellitic dianhydride, a polyamic acid of biphenyl tetracarboxylic dianhydride, a polyamic acid of biphenyl tetracarboxylic dianhydride, a polyamic acid of benzophenone tetracarboxylic dianhydride, a polyamic acid of benzophenone tetracarboxylic dianhydride, and the like and mixtures thereof.

In embodiments, the anhydride capped polyamic acid oligomers are formed from the reaction of a dianhydride and a diamine. Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl)sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis-(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the anhydride capped polyamic acid oligomers include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)phenyl]sulfide, bis[4-(3-aminophenoxy)phenyl]sulfone, bis[4-(3-aminophenoxy)phenyl]ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like and mixtures thereof.

Exemplary multi-amines suitable for crosslinking of anhydride capped polyamic acid oligomers include diamines and triamines. The diamines listed above can be use to crosslink the dianhydride capped poly(amic) acid oligomers. Example of additional multi-amine compounds include 1,3,5-triaminophenoxybenzene, 1,3,5-triaminobenzene, cyclohexane-1,3,5-triamine, 1,3,5-triazine-2,4,6-triamine, 1,3,5-triazine-2,4,6-triamine, N2-(4,6-diamino-1,3,5-triazin-2-yl)-1,3,5-triazine-2,4,6-triamine, N2-(4,6-diamino-1,3,5-triazin-2-yl)-1,3,5-triazine-2,4,6-triamine, N2-(4,6-diamino-1,3,5-triazin-2-yl)-1,3,5-triazine-2,4,6-triamine, N2-(4,6-diamino-1,3,5-triazin-2-yl)-1,3,5-triazine-2,4,6-triamine, N2-(4,6-diamino-1,3,5-triazin-2-yl)-octa(aminophenyl)silsesquioxane.

The anhydride capped polyamic acid oligomers and multi-amines are, for example, selected in a weight ratio of diamine or triamine to polyamic acid oligomers of from about 1 percent to about 5 percent, and more specifically, in an about 2 percent weight ratio. The above anhydrides and diamines and triamines are used singly or as a mixture, respectively. A dianhydride and a diamine are mixed at room temperature in an aprotic organic solvent such as NMP, DMAc, or DMF to form a polyamic acid. The triamine is added into the polyamic acid solution, and then acetic anhydride and pyridine are added for chemical imidization. Gels are formed in about 20 min after addition of acetic anhydride and pyridine. After aging for 12 hours, the gel is extracted with a series of solutions including a solution of 75 weight percent NMP in acetone, 25 weight percent NMP in acetone, and 100 percent acetone. The solvent is removed by supercritical $CO_2$ extraction at 31° C./1100-1400 psi, followed by drying under vacuum at 80° C.

The polyamic acid oligomers and amine composition includes a solvent. Examples of the solvent selected to form the composition include toluene, hexane, cycloheaxne, heptane, tetrahydrofuran, methyl ethyl ketone, methyl isobutyl ketone, N,N'-dimethylformamide, N,N'-dimethylacetamide, N-methyl pyrrolidone (NMP), methylene chloride and the like and mixtures thereof where the solvent is selected, for example, in an amount of from about 70 weight percent to about 95 weight percent, and from 80 weight percent to about 90 weight percent based on the amounts in the coating mixture.

After formation of the polyimide gel layer, it is necessary to remove the solvent from the gel. This is accomplished by exchanging the solvent with supercritical $CO_2$, and vacuum drying to remove the $CO_2$ to leave the pores in the gel intact. In embodiments, the solvent of the coating solution can be exchanged with a second solvent such as acetone which is soluble in supercritical $CO_2$, which improves solvent removal. The conditions for removing the $CO_2$ include a temperature of about 31° C. and a pressure of from about 1100 psi to about 1400 psi.

After the polyimide aerogel layer is provided on the fuser member, a release layer is provided on top of the polyimide aerogel layer. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like. After coating the fluoropolymer release layer, the coating is cured at a temperature of from about 255° C. to about 360° C. or from about 280° C. to about 330° C.

Fluoropolymers suitable for use as the release layer fluoroplastics comprising a monomeric repeat unit that is selected from the group consisting of vinylidene fluoride, hexafluoropropylene, tetrafluoroethylene, perfluoroalkylvinylether, and mixtures thereof. Examples of fluoroplastics include polytetrafluoroethylene (PTFE); perfluoroalkoxy polymer resin (PFA); and copolymer of tetrafluoroethylene (TFE) and hexafluoropropylene (HFP), and mixtures thereof. The fluoroplastic provides chemical and thermal stability and has a low surface energy. The fluoroplastic has a melting temperature of from about 280° C. to about 400° C. or from about 290° C. to about 390° C. or from about 300° C. to about 380° C.

Fluoropolymers suitable for use as the release layer include fluoroelastomers suitable for use in the formulation described are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR, FOR-LHF®, NM® FOR-THF®, FOR-TFS® TH® NH®, P757® TNS®, T439 PL958® BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer. The fluoroelastomers are cured at a temperature of from about 80° C. to about 250° C.

The polyimide aerogel layer has improved properties when compared with silicone or fluoroelastomers. The polyimide aerogel layer is mechanically tough and heat resistant. The polyimide structure can be tailored. The polyimide aerogel layer readily adheres to polyimide substrates.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Preparation of polyimide aerogel coating was conducted. A solution of biphenyl-3,3',4,4'-tetracarboxylic dianhydride (BPDA) (2.395 g, 8.15 mmol) and 4,4'-oxydianiline (ODA) (1.58 g, 7.9 mmol) in 25 mL of n-methylppyrrolidine (NMP) was stirred at room temperature under argon gas for 30 min. To the solution, a solution of 1,3,5,-triaminophenoxybenzene (TAB) (0.175 mmol, 0.07 g) in 8 mL of NMP was added. This solution was stirred for 1 hour, and then acetic anhydride (65 mmol, 6.15 g) and pyridine (65 mmol, 5.14 g) were added the solution. The solution was coated onto a polyimide belt substrate and a gel layer was formed within 20 minutes. The gel layer was aged for 24 hours. Following aging, the gel was extracted with a solution of 75% NMP in acetone and soaked overnight. The solvent in the gel was exchanged in 24 hour intervals with 25% NMP in acetone, and then 100% acetone. Finally, supercritical $CO_2$ extraction at about 1100 psi at 31° C. and drying under vacuum results in a polyimide aerogel layer having a porosity of about 90 percent. The polyimide aerogel layer has excellent flexibility, high tensile strengths (i.e. 4-9 MPa), and high onset decomposition temperatures (i.e., 460° C.-610° C.).

A surface release layer of fluoroplastic was coated on the polyimide aerogel layer. A PFA coating dispersion containing PFA MP320 (9 grams) purchased from DuPont, poly(propylenecarbonate) (0.675 grams), fluorinate surfactant GF400 (0.09 grams), methyl ethyl ketone (9 grams) and cyclohexanone (9 grams) was combined and sonicated and applied to the polyimide aerogel layer by flow-coating at the flow rate of 3 ml/min with a coating speed of 2 mm/sec. The resulting coating was heated in the oven for one hour to remove the solvents and followed by heating for 15 minutes at 340° C. to form the continuous fuser topcoat.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:
   a substrate;
   an intermediate layer consisting of: polyimide aerogel disposed on the substrate wherein the polyimide aerogel has a porosity of from about 50 percent to about 95 percent; and
   a surface layer comprising a fluoropolymer disposed on the intermediate layer.

2. The fuser member of claim 1 wherein the polyimide aerogel has a thickness of from about 0.010 mm to about 10 mm.

3. The fuser member of claim 1 wherein the polyimide aerogel has a density of from about 0.1 $gm/cm^3$ to about 0.5 $gm/cm^3$.

4. The fuser member of claim 1 wherein the polyimide aerogel has a surface area of from about 100 $m^2/g$ to about 550 $m^2/g$.

5. The fuser member of claim 1 wherein the polyimide aerogel has a pore diameter of from about 2 nm to about 200 nm.

6. The fuser member of claim 1 wherein the fluoropolymer is a fluoroplastic selected from the group consisting of: polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP) and a cure site monomer, and mixtures thereof.

7. The fuser member of claim 1 wherein the fluoropolymer is a fluoroelastomer selected from the group consisting of: copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

8. The fuser member of claim 1, wherein the substrate comprises a material selected from the group consisting of: polyimide, polyaramide, polyether ether ketone, polyetherimide, polyphthalamide, polyamide-imide, polyketone, polyphenylene sulfide, fluoropolyimides, fluoropolyurethanes, aluminum, nickel and stainless steel.

9. A fuser member comprising:

a substrate;

an intermediate layer consisting of: polyimide aerogel disposed on the substrate wherein the polyimide aerogel has a porosity of from about 50 percent to about 95 percent and wherein the polyimide aerogel has a pore diameter of from about from about 2 nm to about 200 nm; and a surface layer comprising a fluoropolymer disposed on the intermediate layer.

10. The fuser member of claim 9, wherein the polyimide aerogel has a thickness of from about 0.010 mm to about 10 mm.

11. The fuser member of claim 9, wherein the polyimide aerogel has a density of from about 0.1 gm/cm$^3$ to about 0.5 gm/cm$^3$.

12. The fuser member of claim 9, wherein the polyimide aerogel has a surface area of from about 100 m$^2$/g to about 550 m$^2$/g.

13. The fuser member of claim 9, wherein the fluoropolymer comprises a fluoroplastic selected from the group consisting: of polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP) and a cure site monomer, and mixtures thereof.

14. The fuser member of claim 9, wherein the substrate comprises a material selected from the group consisting of: polyimide, polyaramide, polyether ether ketone, polyetherimide, polyphthalamide, polyamide-imide, polyketone, polyphenylene sulfide, fluoropolyimides, fluoropolyurethanes, aluminum, nickel and stainless steel.

15. The fuser member of claim 9, further comprising an adhesive layer disposed between the substrate and the intermediate layer.

16. The fuser member of claim 9, further comprising an adhesive layer disposed between the intermediate layer and the surface layer.

17. A fuser member comprising:

a substrate;

intermediate layer consisting of: polyimide aerogel disposed on the substrate, wherein the polyimide aerogel has a porosity of from about 50 percent to about 95 percent and wherein the polyimide aerogel has pores having a pore diameter of from about 2 nm to about 200 nm, wherein the polyimide aerogel has a thickness of from about 0.5 mm to about 10 mm; and a surface layer comprising a fluorolastic selected from the group consisting of: polytetrafluoroethylene and perfluoroalkoxy polymer resin disposed on the intermediate layer.

18. The fuser member of claim 17, wherein the surface layer has a thickness of from about 1 micron to about 400 microns.

19. The fuser member of claim 17, wherein the surface layer further comprises fillers.

20. The fuser member of claim 17, wherein the polyimide aerogel has a surface area of from about 100 m$^2$/g to about 550 m$^2$/g.

* * * * *